(12) United States Patent
Fuller et al.

(10) Patent No.: US 8,268,252 B2
(45) Date of Patent: Sep. 18, 2012

(54) NITROSYL SPECIAL CONNECTOR

(75) Inventors: Jody Fuller, Merritt Island, FL (US);
David H. Fine, Cocoa Beach, FL (US)

(73) Assignee: GENO LLC, Cocoa, FL (US)

( * ) Notice: Subject to any disclaimer, the term of this patent is extended or adjusted under 35 U.S.C. 154(b) by 0 days.

(21) Appl. No.: 13/094,541

(22) Filed: Apr. 26, 2011

(65) Prior Publication Data

US 2011/0262335 A1    Oct. 27, 2011

Related U.S. Application Data

(60) Provisional application No. 61/328,004, filed on Apr. 26, 2010.

(51) Int. Cl.
*A62B 7/08*      (2006.01)
*B01J 10/00*     (2006.01)

(52) U.S. Cl. ........ 422/120; 422/122; 422/129; 422/538; 422/544; 285/330; 423/239.1

(58) Field of Classification Search .................. 422/120, 422/122, 129, 538, 544; 285/330; 29/890.14; 423/239.1

See application file for complete search history.

(56) References Cited

U.S. PATENT DOCUMENTS

| | | | |
|---|---|---|---|
| 4,827,960 A | 5/1989 | Nitzberg | |
| 5,411,350 A | 5/1995 | Breault | |
| 7,195,228 B2 * | 3/2007 | Tiberghien et al. | ........ 251/149.6 |
| 7,516,742 B2 | 4/2009 | Stenzler et al. | |
| 2008/0317874 A1 | 12/2008 | Fine et al. | |

OTHER PUBLICATIONS

International Search Report for PCT Application PCT/US2011/033964 mailed Jul. 21, 2011.

* cited by examiner

*Primary Examiner* — Walter D Griffin
*Assistant Examiner* — Lessanework Seifu
(74) *Attorney, Agent, or Firm* — Steptoe & Johnson LLP

(57) ABSTRACT

A unique combination of male and female gas connectors for one way transfer of gasses.

33 Claims, 22 Drawing Sheets

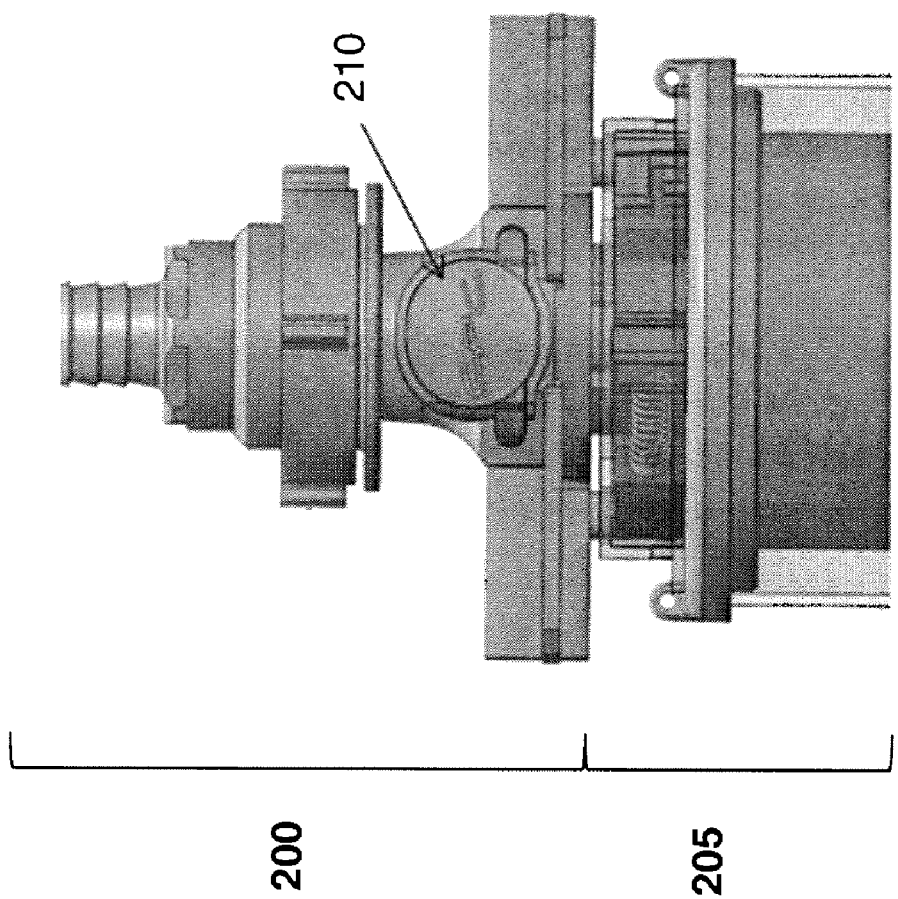

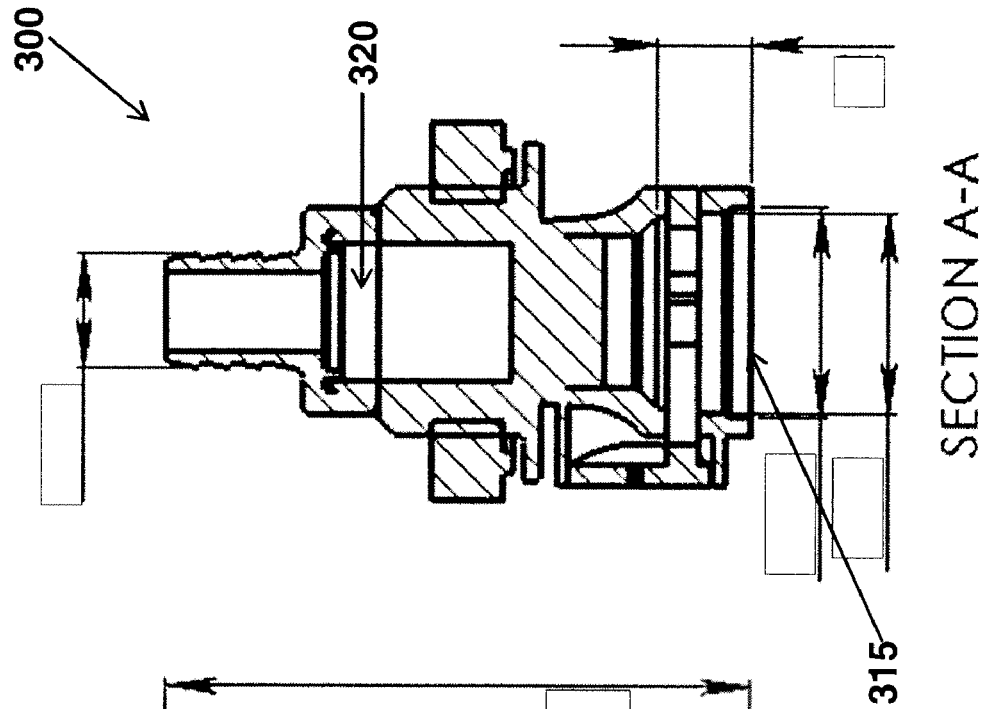
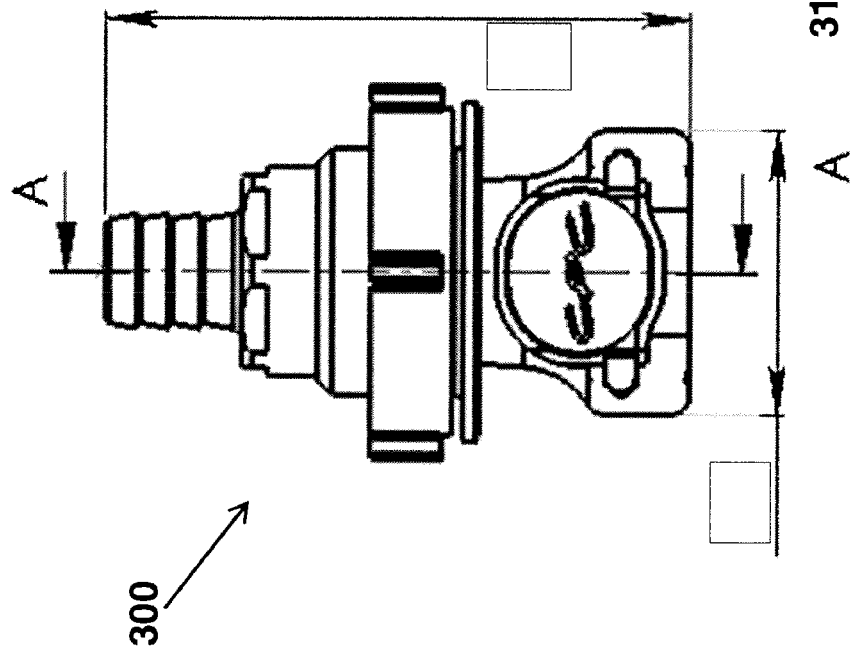

NITROSYL SPECIAL CONNECTOR

CLAIM OF PRIORITY

This application claims the benefit of prior U.S. Provisional Application No. 61/328,004 filed on Apr. 26, 2010, which is incorporated by reference in its entirety.

TECHNICAL FIELD

This description relates to a unique combination of male and female gas connectors for one way transfer of gasses.

BACKGROUND

Nitric oxide (NO), also known as nitrosyl radical, is a free radical that is an important signalling molecule. For example, NO can cause smooth muscles in blood vessels to relax, thereby resulting in vasodilation and increased blood flow through the blood vessel. These effects can be limited to small biological regions since NO can be highly reactive with a lifetime of a few seconds and can be quickly metabolized in the body.

Some disorders or physiological conditions can be mediated by inhalation of nitric oxide (NO). The use of low concentrations of inhaled nitric oxide (NO) can prevent, reverse, or limit the progression of disorders which can include, but are not limited to, acute pulmonary vasoconstriction, traumatic injury, aspiration or inhalation injury, fat embolism in the lung, acidosis, inflammation of the lung, adult respiratory distress syndrome, acute pulmonary edema, acute mountain sickness, post cardiac surgery acute pulmonary hypertension, persistent pulmonary hypertension of a newborn, perinatal aspiration syndrome, haline membrane disease, acute pulmonary thromboembolism, heparin-protamine reactions, sepsis, asthma and status asthmaticus or hypoxia. Nitric oxide (NO) can also be used to treat chronic pulmonary hypertension, bronchopulmonary dysplasia, chronic pulmonary thromboembolism and idiopathic or primary pulmonary hypertension or chronic hypoxia.

Generally, nitric oxide (NO) can be inhaled or otherwise delivered to the individual's lungs. Providing a therapeutic dose of NO could treat a patient suffering from a disorder or physiological condition that can be mediated by inhalation of NO or supplement or minimize the need for traditional treatments in such disorders or physiological conditions. Typically, the NO gas can be supplied in a bottled gaseous form diluted in nitrogen gas ($N_2$). Great care should be taken to prevent the presence of even trace amounts of oxygen ($O_2$) in the tank of NO gas because the NO, in the presence of $O_2$, can be oxidized to nitrogen dioxide ($NO_2$). Unlike NO, the part per million levels of $NO_2$ gas can be highly toxic if inhaled and can form nitric and nitrous acid in the lungs.

SUMMARY

In one aspect, a combination of connectors for a nitric oxide delivery system can include a female connector and a male connector. A female connector can be coupled to a nitrogen dioxide source. A male connector can be coupled to a cartridge. In some embodiments, a cartridge can include an inlet, an outlet, and a surface-active material coated with a reducing agent. An inlet can be configured to receive a gas flow comprising nitrogen dioxide and fluidly communicate the gas flow to an outlet through a surface-active material such that a reducing agent can react with nitrogen dioxide in the gas flow and can convert the nitrogen dioxide to nitric oxide.

In some embodiments, a male connector can be coupled to a cartridge by molding the male connector into a portion of the cartridge. In some embodiments, a male connector can be molded into the cap of a cartridge.

In some embodiments, a female connector can include an opening. In some embodiments, a male connector can include a protrusion. In some embodiments, a protrusion of a male connector can be configured to be inserted securely into an opening of a female connector.

In some embodiments, an opening in a female connector can include at least one tenon. In some embodiments, a protrusion of a male connector can include at least one mortise. In some embodiments, the at least one tenon can be configured to be inserted securely into the at least one mortise.

In some embodiments, a male connector can include a rotational ring and a ring housing. In some embodiments, a rotational ring and a ring housing can encircle a protrusion of a male connector. In some embodiments, a rotational ring can be configured to rotate within a ring housing.

In some embodiments, a rotational ring can be biased to rotate to a first position. In some embodiments, a rotational ring can be held in a second position by a catching mechanism. In some embodiments, a ring housing can include at least one hole and a rotational ring can include at least one extension. In some embodiments, an at least one extension in a rotational ring may not align with an at least one hole in a ring housing when the rotational ring is in a second position. In some embodiments, an at least one extension in a rotational ring can align with an at least one hole in a ring housing when a rotational ring is in a first position.

In some embodiments, a female connector can include at least one pin. In some embodiments, an at least one pin can be configured to be inserted into an at least one hole in a ring housing. In some embodiments, a female connector can be configured to release a catching mechanism. In some embodiments, a pin of a female connector can be configured to release a catching mechanism.

In some embodiments, a female connector can include a check valve. In some embodiments, a check valve can prevent a gas from flowing from a nitrogen dioxide source out a female connector. In some embodiments, a check valve can prevent a gas from flowing from a nitrogen dioxide source out a female connector when the female connector is not connected to a male connector In another aspect, a cartridge can include a male connector. A male connector can be coupled to a cartridge.

In some embodiments, a male connector can be configured to attach to a female connector. In some embodiments, a cartridge can include an inlet, an outlet, and a surface-active material coated with a reducing agent. In some embodiments, an inlet can be configured to receive a gas flow comprising nitrogen dioxide and fluidly communicate the gas flow to an outlet through a surface-active material such that a reducing agent can react with nitrogen dioxide in the gas flow and can convert the nitrogen dioxide to nitric oxide.

In some embodiments, a male connector can be coupled to a cartridge by molding the male connector into a portion of a cartridge. In some embodiments, a male connector can be molded into a cap of a cartridge.

In some embodiments, a male connector can include a protrusion. In some embodiments, a protrusion can include at least one tenon.

In some embodiments, a male connector further can include a rotational ring and a ring housing. In some embodiments, a rotational ring and a ring housing can encircle a protrusion of a male connector.

In some embodiments, a rotational ring can be configured to rotate within a ring housing. In some embodiments, a rotational ring can biased to rotate to a first position. In some embodiments, a rotational ring can be held in a second position by a catching mechanism.

In some embodiments, a ring housing can include at least one hole and a rotational ring can include at least one extension. In some embodiments, an at least one extension in a rotational ring may not align with an at least one hole in a ring housing when the rotational ring is in a second position. In some embodiments, an at least one extension in a rotational ring can align with an at least one hole in a ring housing when the rotational ring is in a first position.

In another aspect, a method of converting nitrogen dioxide to nitric oxide can include connecting a female connector to a male connector, and passing a gas flow including nitrogen dioxide through the female connector and the male connector into the inlet of a cartridge. In some embodiments, a female connector can be connected to a nitrogen dioxide source. In some embodiments, a male connector can be connected to a cartridge. In some embodiments, a cartridge can include an inlet, an outlet, and a surface-active material coated with a reducing agent. In some embodiments, an inlet can be configured to receive a gas flow including nitrogen dioxide and fluidly communicate the gas flow to an outlet through a surface-active material, such that a reducing agent can react with nitrogen dioxide in the gas flow and can convert the nitrogen dioxide to nitric oxide. In some embodiments, connecting the female connector to the male connector can include inserting a protrusion of the male connector securely into an opening of the female connector.

In some embodiments, the opening of the female connector can include an at least one tenon and the protrusion of the male connector can include an at least one mortise. In some embodiments, inserting a protrusion of the male connector into an opening of the female connector can include inserting the at least one tenon into the at least one mortise.

In some embodiments, a method can further include inserting an at least one pin of the female connector into an at least one hole in a ring housing of the male connector that may not be aligned with an at least one extension in a rotational ring of the male connector. In some embodiments, the rotational ring can be biased to rotate to a first position and the rotational ring can be held in a second position by a catching mechanism.

In some embodiments, inserting the at least one pin of the female connector into the at least one hole in the ring housing of the male connector can release a catching mechanism.

In some embodiments, a method can further include removing the at least one pin of the female connector from the at least one hole in the ring housing. In some embodiments, a method can include permitting the rotational ring to rotate to the first position, where the at least one hole in the ring housing can align with the at least one extension of the rotational ring when the rotational ring is in the first position.

In another aspect, a method of manufacturing a cartridge can include coupling a male connector to a cartridge. In some embodiments, the male connector can be configured to attach to a female connector. In some embodiments, the cartridge can include an inlet, an outlet, and a surface-active material coated a reducing agent. The inlet can be configured to receive a gas flow comprising nitrogen dioxide and fluidly communicate the gas flow to the outlet through the surface-active material, such that the reducing agent can react with nitrogen dioxide in the gas flow and can convert the nitrogen dioxide to nitric oxide.

In some embodiments, coupling the male connector to the cartridge can include molding the male connector into a portion of the cartridge.

In some embodiments, the male connector can be molded into a cap of the cartridge.

In some embodiments, the male connector can include a protrusion and the protrusion can include an at least one tenon.

In some embodiments, the male connector can further include a rotational ring and a ring housing.

Other features will become apparent from the following detailed description, taken in conjunction with the accompanying drawings, which illustrate by way of example, the features of the various embodiments.

BRIEF DESCRIPTION OF THE DRAWINGS

FIG. 2 illustrates a female connector.
FIGS. 3A and 3B show the dimensions of a female connector.

DETAILED DESCRIPTION

When delivering nitric oxide (NO) for therapeutic use to a mammal, it can be important to avoid delivery of nitrogen dioxide ($NO_2$) to the mammal. Nitrogen dioxide ($NO_2$) can be formed by the oxidation of nitric oxide (NO) with oxygen ($O_2$). The rate of formation of nitrogen dioxide ($NO_2$) can be proportional to the oxygen ($O_2$) concentration multiplied by the square of the nitric oxide (NO) concentration.

A NO delivery system can convert nitrogen dioxide to nitric oxide. The system can employ a surface-active material coated with a reducing agent, for example an antioxidant, as a simple and effective mechanism for making the conversion. More particularly, $NO_2$ can be converted to NO by passing the dilute gaseous $NO_2$ over a surface-active material coated with an aqueous solution of a reducing agent, e.g. an antioxidant.

As an example, when the aqueous antioxidant is ascorbic acid (that is, vitamin C), the reaction can be quantitative at ambient temperatures.

One example of a surface-active material can be silica gel. Another example of a surface-active material that can be used is cotton. The surface-active material may be or may include a substrate capable of retaining a liquid, for example, water. A surface-active material can include a relatively large surface area. A surface-active material can also allow a fluid to pass through it. Another type of surface-active material that has a large surface area that is capable of absorbing moisture also may be used.

Figure 1:
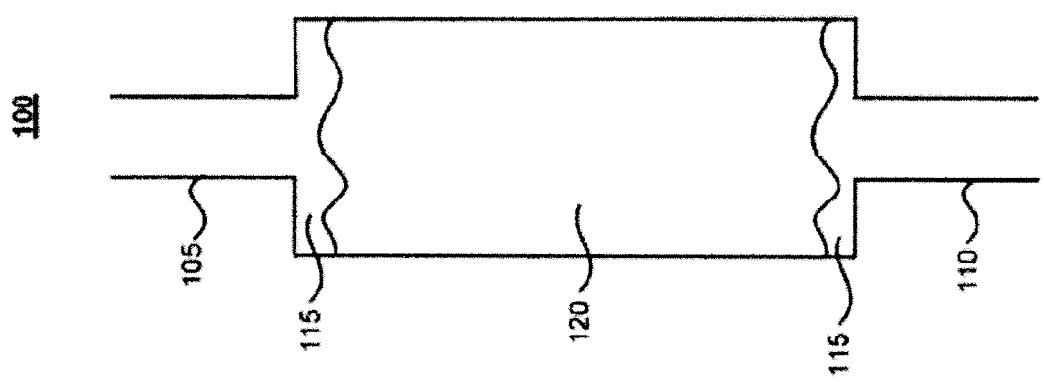
FIG. 1 is a diagram of a NO delivery system.

FIG. 1 illustrates a cartridge 100 for generating NO by converting $NO_2$ to NO. The cartridge 100, which may be referred to as a cartridge, a converter, a NO generation cartridge, a GENO cartridge, or a GENO cylinder or Nitrosyl™ Primary Cartridge, can include an inlet 105 and an outlet 110. Screen and/or glass wool 115 can be located at the inlet 105 and/or the outlet 110. The remainder of the cartridge 100 can be filled with a surface-active material 120 that is coated with a reducing agent. The surface-active material can be soaked with a saturated solution including a reducing agent to coat the surface-active material. The saturated solution can be, for example, an antioxidant in water. The screen and/or glass wool 115 can also be soaked with the saturated solution before being inserted into the cartridge 100. The antioxidant can be ascorbic acid.

In a general process for converting $NO_2$ to NO, a gas flow (e.g. air flow) having $NO_2$ can be received through the inlet 105. The gas flow can be fluidly communicated to the outlet 110 through the surface-active material 120 coated with the aqueous reducing agent, e.g. antioxidant. As long as the surface-active material remains moist and the reducing agent may not been used up in the conversion, the general process can be effective at converting $NO_2$ to NO at ambient temperature.

The inlet 105 also may receive a gas flow, e.g. air flow, having $NO_2$, for example, from source of $NO_2$. A source of $NO_2$ can include a pressurized bottle of $NO_2$, which also may be referred to as a tank of $NO_2$. The inlet 105 also may receive a gas flow with $NO_2$ in nitrogen ($N_2$), air, or oxygen ($O_2$). The conversion can occur over a wide concentration range. Experiments have been carried out at concentrations in a gas including from about 2 ppm $NO_2$ to 100 ppm $NO_2$, and even to over 1000 ppm $NO_2$. In one example, a cartridge that was approximately 6 inches long and had a diameter of 1.5-inches was packed with silica gel that had first been soaked in a saturated aqueous solution of ascorbic acid. The moist silica gel was prepared using ascorbic acid (i.e., vitamin C) designated as A.C.S reagent grade 99.1% pure from Aldrich Chemical Company and silica gel from Fischer Scientific International, Inc., designated as S8 32-1, 40 of Grade of 35 to 70 sized mesh. Other sizes of silica gel also can be effective. For example, silica gel having an eighth-inch diameter could also work.

The surface active material, e.g. silica gel, can be moistened with a solution including a reducing agent, e.g. a saturated solution including a reducing agent. For example, a saturated solution of ascorbic acid in water; more specifically, the saturated solution can be a saturated solution that had been prepared by mixing 35% by weight ascorbic acid in water, stirring, and straining the water/ascorbic acid mixture through the silica gel, followed by draining. The conversion of $NO_2$ to NO can proceed well when the surface active material (e.g. silica gel) coated with a reducing agent (e.g. ascorbic acid) is moist. The conversion of $NO_2$ to NO may not proceed well with a reducing agent alone, for example, in an aqueous solution of ascorbic acid alone.

The cartridge can be filled with the wet silica gel/reducing agent. For example, a cartridge filled with the wet silica gel/ascorbic acid was able to convert 1000 ppm of $NO_2$ in air to NO at a flow rate of 150 ml per minute, quantitatively, non-stop for over 12 days. A wide variety of flow rates and $NO_2$ concentrations have been successfully tested, ranging from only a few ml per minute to flow rates of up to 5,000 ml per minute. Any appropriate reducing agent that can convert $NO_2$ or $N_2O_4$ to NO can be used as determined by a person of skill in the art. For example, the reducing agent can include a hydroquinone, glutathione, thiols, nitrites, and/or one or more reduced metal salts such as Fe(II), Mo(VI), NaI, Ti(III) or Cr(III). The reducing agent can be an antioxidant. The antioxidant can be an aqueous solution of an antioxidant. The antioxidant can be ascorbic acid, alpha tocopherol, or gamma tocopherol. Any appropriate antioxidant can be used depending on the activities and properties as determined by a person of skill in the art. The antioxidant can be used dry or wet.

The antioxidant/surface-active material GENO cartridge may be used for inhalation therapy. In one such example, the GENO cartridge can be used as a $NO_2$ scrubber for NO inhalation therapy that delivers NO from a pressurized bottle source. The GENO cartridge can be used to remove any $NO_2$ that chemically forms during inhalation therapy. This GENO cartridge can be used to help ensure that no harmful levels of $NO_2$ are inadvertently inhaled by the patient.

The GENO cartridge may be used to supplement or replace some or all of the safety devices used during inhalation therapy in conventional NO inhalation therapy. For example, one type of safety device can warn of the presence of $NO_2$ in air when the concentration of $NO_2$ exceeds a preset or predetermined limit, usually 1 part per million or greater of $NO_2$. Such a safety device may be unnecessary when a GENO cartridge is positioned in a NO delivery system just prior to the patient breathing the NO laden air. The GENO cartridge can convert any $NO_2$ to NO just prior to the patient breathing the NO laden gas, which can make a device to warn of the presence of $NO_2$ in gas unnecessary.

Alternatively or additionally, a $NO_2$ removal cartridge can be inserted just before the attachment of the delivery system to the patient to further enhance safety and help ensure that all traces of the toxic $NO_2$ have been removed. The $NO_2$ removal cartridge may be a GENO cartridge used to remove any trace amounts of $NO_2$. Alternatively, the $NO_2$ removal cartridge may include heat-activated alumina. A cartridge with heat-activated alumina, such as supplied by Fisher Scientific International, Inc., designated as A505-212, of 8-14 sized mesh can be effective at removing low levels of $NO_2$ from an air or oxygen stream, and yet can let NO gas pass through without loss. Activated alumina, and other high surface area materials like it, can be used to scrub $NO_2$ from a NO inhalation line.

The cartridge may be connected to a pressurized bottle of $NO_2$, which also may be referred to as a tank of $NO_2$, through a combination of male and female connectors. Such a combination can enable gas flow and may be unique in a way that this combination can only fit the cartridge described herein. The combination of connectors can function to ensure a one time or single use feature for the cartridge. The combination of connectors can function to provide added safety features to the NO delivery system.

FIG. 2 depicts a female connector 200 connected to a male connector 205. The female connector 200 used herein can be a female connector made by Colder Products Company, St. Paul, Minn. (Part Number 80400). Suitable female connectors can include an off-the-shelf female connector that is made of polysulfone or any other appropriate materials that are compatible with $NO_2$. Female connectors can be selected based on ease of procurement and its material compatibility. Female connectors can withstand demanding applications including chemical resistance and resistance to cleaning solutions. Female connectors can withstand high temperatures, for example, temperatures of at least 100° C., at least 125° C. or at least 150° C. Female connectors can also be autoclavable. The female connector housing can be made of any metal, for example, mild steel. Female connectors can have an ergonomic design and include latch 210 to produce a coupling that is simple to operate. For example, the latch can be a large, shrouded thumb latch. FIG. 2 depicts a latch 210 that can secure the male and female connectors together and releases with a push and hold until released. Other latches are known to those of skill in the art.

Referring to FIGS. 3A and 3B, a female connector 300 can include an opening 315. The opening 315 can be part of a channel 320 in the female connector, which can allow for the passage of a fluid through the female connector 300. The fluid, typically a gas, for example, a gas including nitrogen dioxide, can traverse from a nitrogen dioxide source into the channel 320 to a male connector inserted in the opening 315 of the female connector 300.

Figure 4:
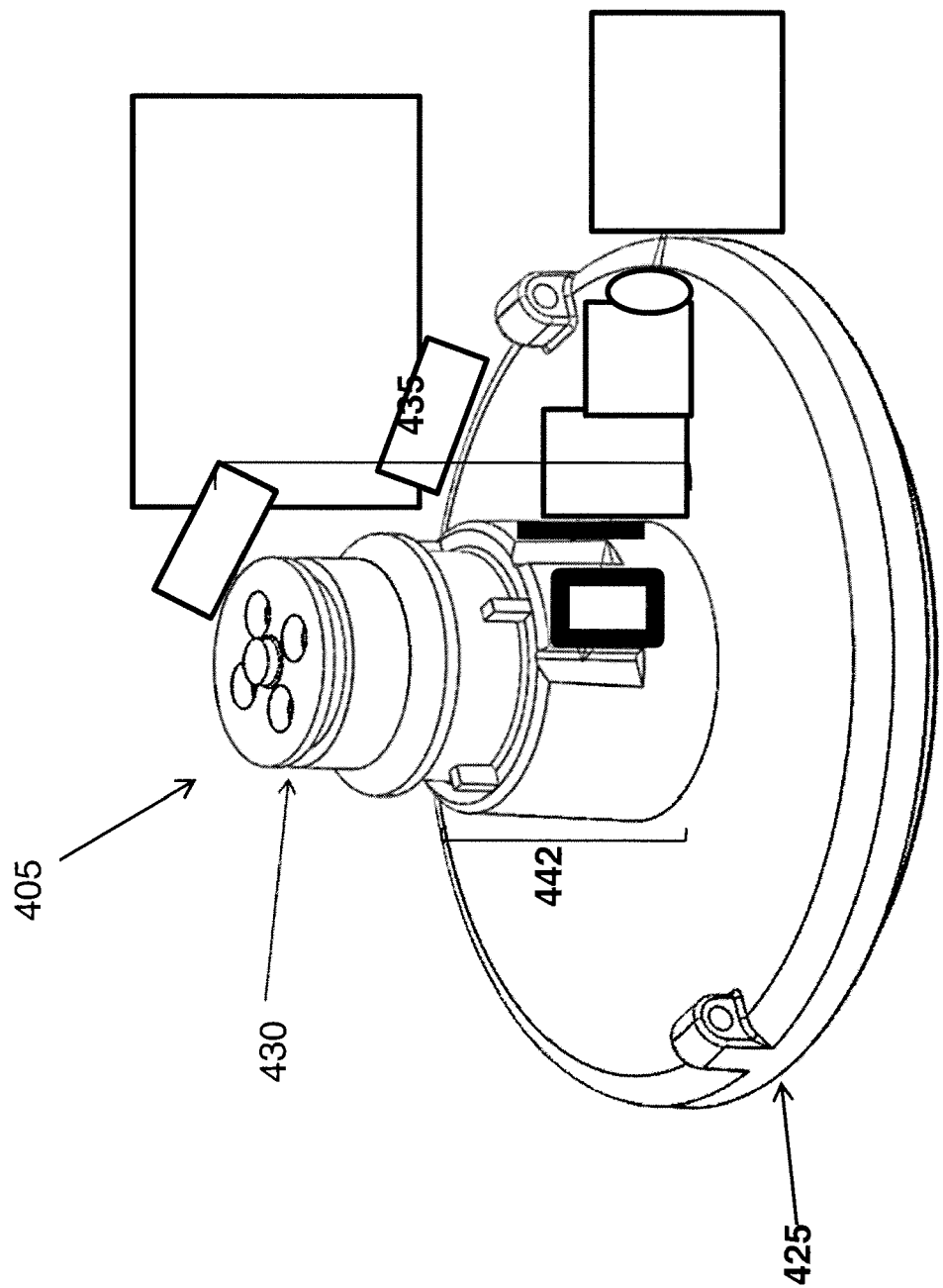
FIG. 4 depicts a perspective view of a male connector.

Another feature the female connector can include a check valve (not shown). A check valve can prevent gas from flowing from a nitrogen dioxide source, specifically, when the female connector is not connected to a male connector. A check valve can prevent gas flow when not connected to the system. The check valve can be essential in the NO delivery system to prevent $NO_2$ from inadvertently flowing into the ambient air. Referring to FIG. 4, a male connector 400 can be attached to a cartridge, as described above. More specifically, a male connector 400 can be molded into the cap 425 of a cartridge. The entire cap 425 and male connector 400 can be a molded part made of polycarbonate. The male cap portion can then be glued with UV cure adhesive, to the cartridge. The male connector 400 can be made to connect to the female connector and can be sealed with an Off-The-Shelf VITON® Floroeelastomer O-ring (for example, Standard Part Number AS568A-016) or any suitable O-rings. See FIG. 4, element 430. The male connector and the female connector can be FDA compliant.

Figure 5:
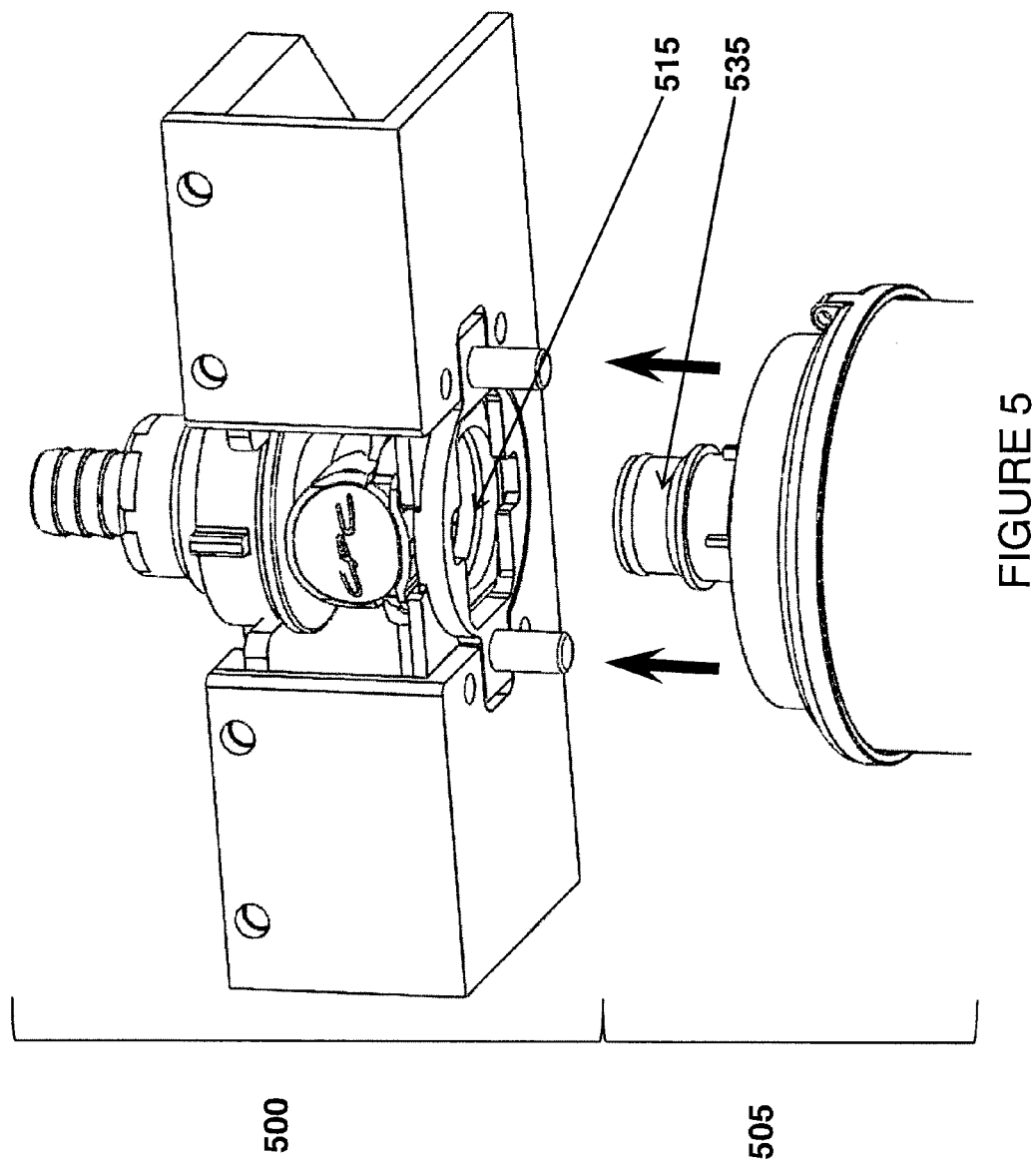
FIG. 5 depicts a perspective view of a male connector and a female connector.
Figure 18:
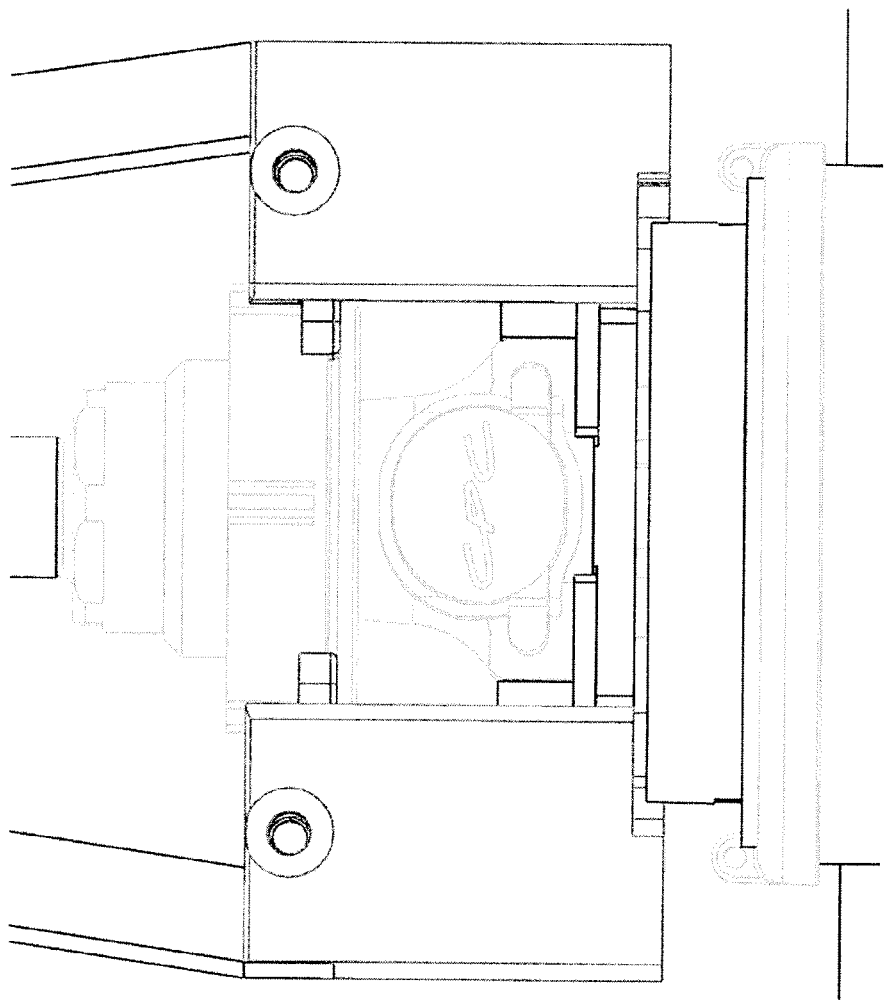
FIG. 18 depicts a female connector attached to a male connector.
Figure 19:
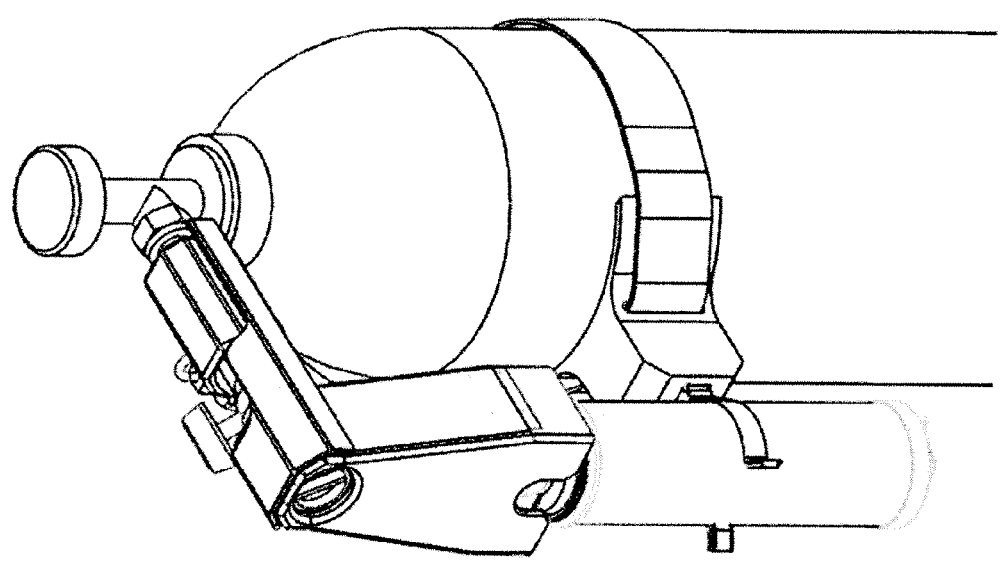
FIG. 19 is a perspective view of the NO delivery system.
Figure 20:
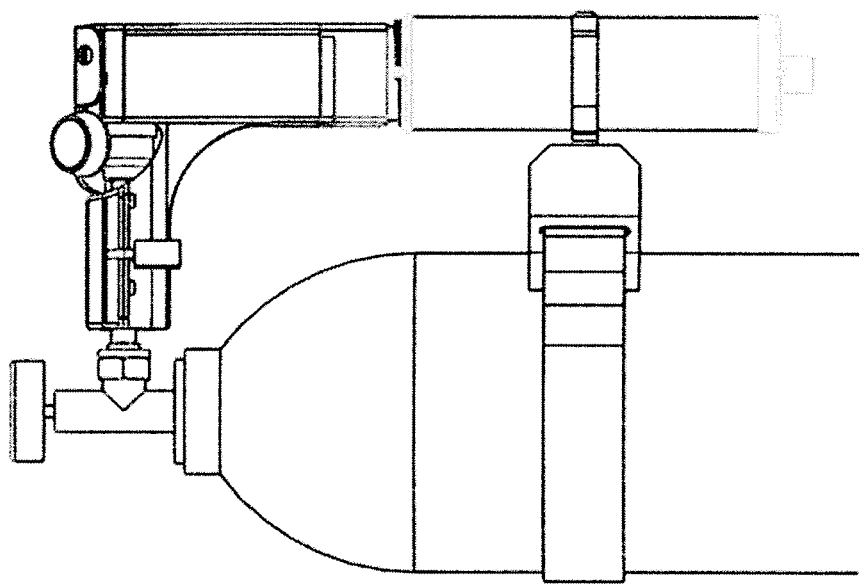
FIG. 20 is a side view of the NO delivery system.
Figure 21:
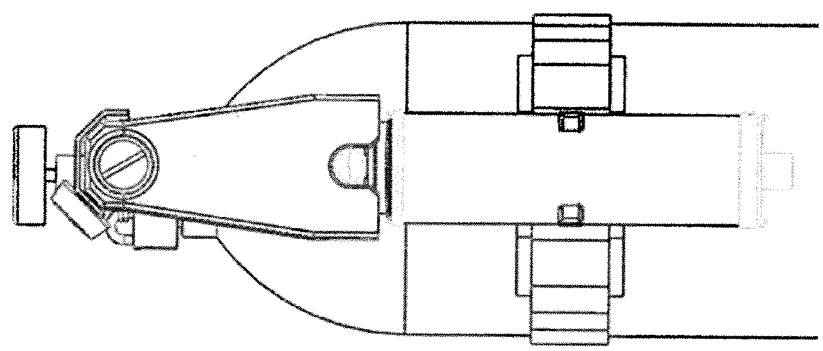
FIG. 21 is a front view of the NO delivery system.

As shown in FIG. 4, a male connector 405 can include a protrusion 435. A protrusion 435 can be inserted into an opening of a female connector (not shown). Referring to FIG. 5, a female connector 500 can include an opening 515 and a male connector 505 can include a protrusion 535. In some embodiments, a protrusion of a male connector can be configured to be inserted securely into an opening of a female connector such that gas flowing through the female connector and the male connector cannot leak out between the connectors or around the connectors. Rather, the protrusion of the male connector fits flush inside the opening of the female connector. In other words, the surface of the protrusion of the male connector can be flush against the surface of the opening of the female connector. Additionally, in some embodiments, the male connector cannot spin or rotate once inserted in the female connector. An additional view of a male connector attached to a female connector is shown in FIG. 18.

Figure 6:
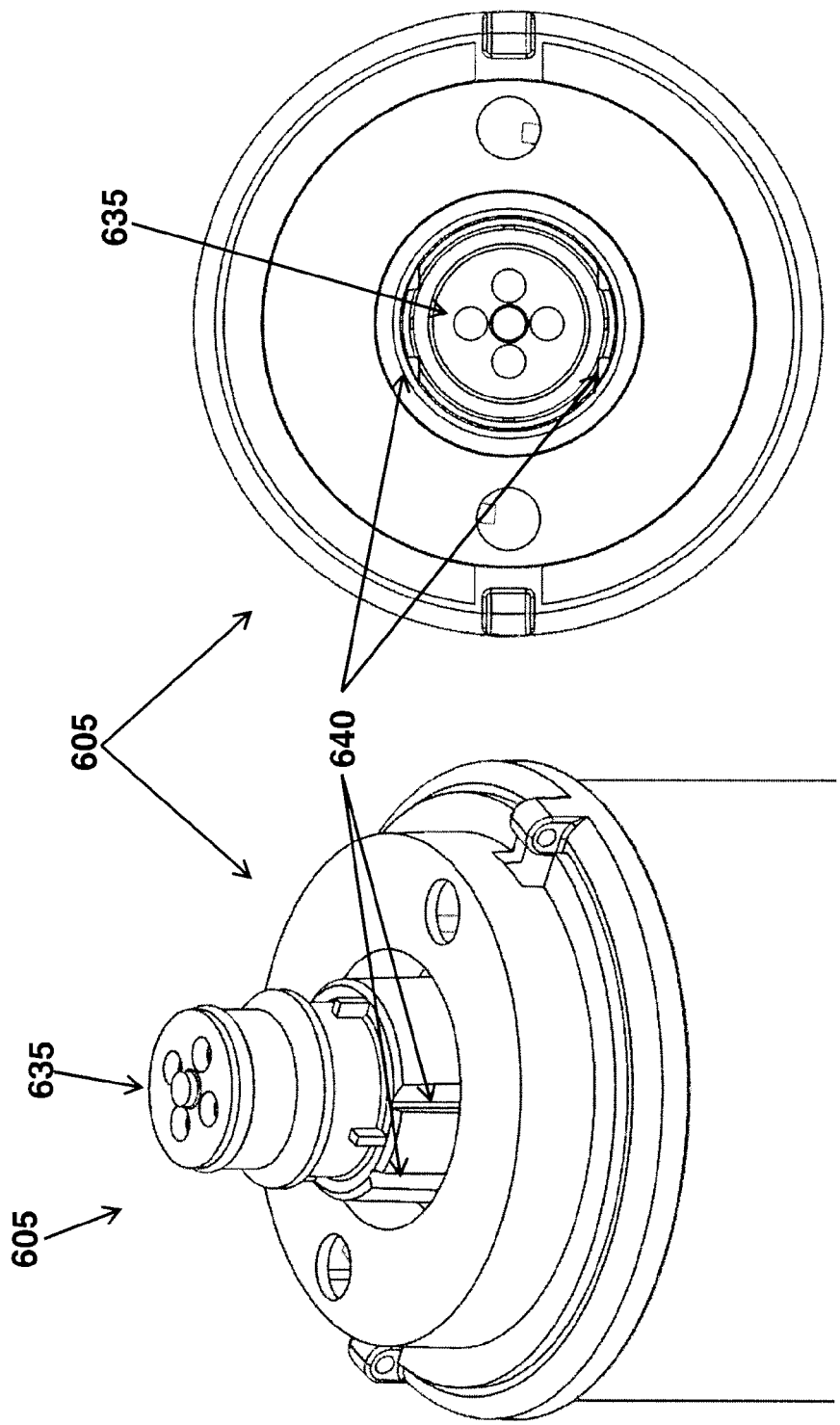
FIGS. 6A and 6B depict perspective views of a male connector.

Referring to FIGS. 6A and 6B, a male connector 605 can include at least one mortise 640, preferably on a protrusion 635 of the male connector. A male connector which includes at least one mortise can be referred to as "keyed" to fit a female connector. A keyed male connector can be unique such that no other male connector can be fitted to the female connector, and consequently, no other cartridge can be used in the NO delivery system. In some embodiments, only the two connectors described herein can be mated.

Figure 7:
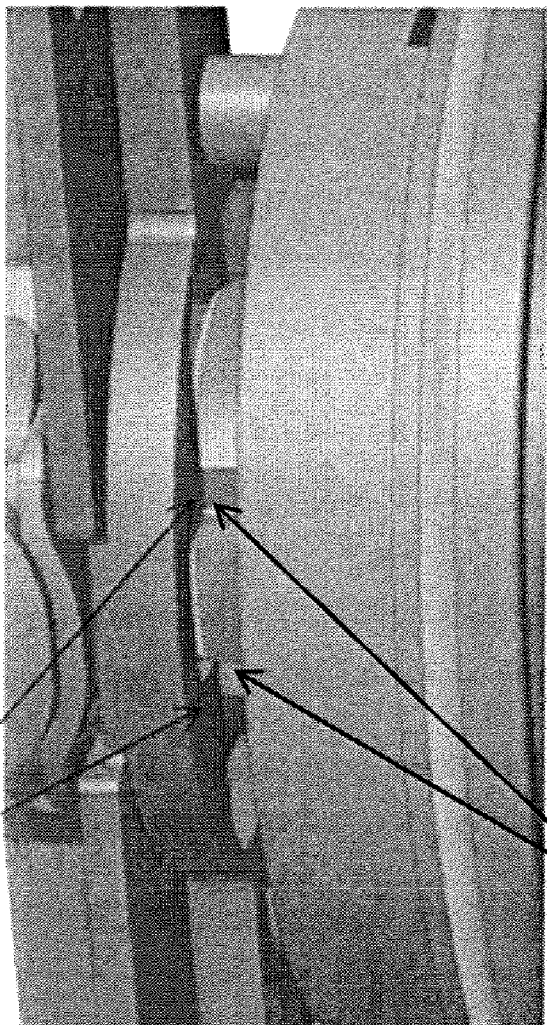
FIG. 7 depicts a perspective view of a male and female connector.

A female connector can include at least one tenon, more specifically, at least one tenon can be on an opening of a female connector (see, for example, element 745, FIG. 7). A male connector can include at least one mortise, preferably on a protrusion of a male connector (see, for example, element 740, FIG. 7). A tenon of a female connector can be configured to be inserted into a mortise of a male connector (see, for example, elements 740 and 745, FIG. 7).

In some embodiments, a female connector can include at least one mortise (not shown), preferably on an opening of a female connector. A male connector can include at least one tenon (not shown), preferably on a protrusion of a male connector. A tenon of a male connector can be configured to be inserted securely into a mortise of a female connector (not shown).

Regardless of whether an at least one tenon is on a male connector or a female connector, the at least one tenon can be configured to fit in the at least one mortise. For example, the distance between tenons, the width of tenons or the depth of tenons can be configured to create a unique tenon combination. The at least one mortise can be configured to match the configuration of the at least one tenon. In this way, at least one tenon and the at least one mortise can fit uniquely together. Consequently, the female connector and the male connector can fit uniquely together. The at least one tenon and the at least one mortise can limit how the male connector and the female connector can connect to each other. As shown in FIG. 7, at least one mortise (i.e. slot or keyed slot) of the protrusion of the male connector and an equal number of tenons (i.e. keys) on the opening of the female connector can fit together. As an example, four keys on the female connector housing (see, for example, element 745, FIG. 7) can fit securely into four keyed slots (see, for example, element 620 of FIG. 6) on the base of the male connector (see, for example, FIG. 7). These "keys" and "slots" can be made to fit together allowing the cartridge attached to the male connector to be used. The female connector can be attached to a custom fabricated "keyed" machine part (see, for example, element 442, FIG. 4) which can be held in the system housing. This "keyed" part can make it a unique connection that can only fit the cartridge.

Figure 8:
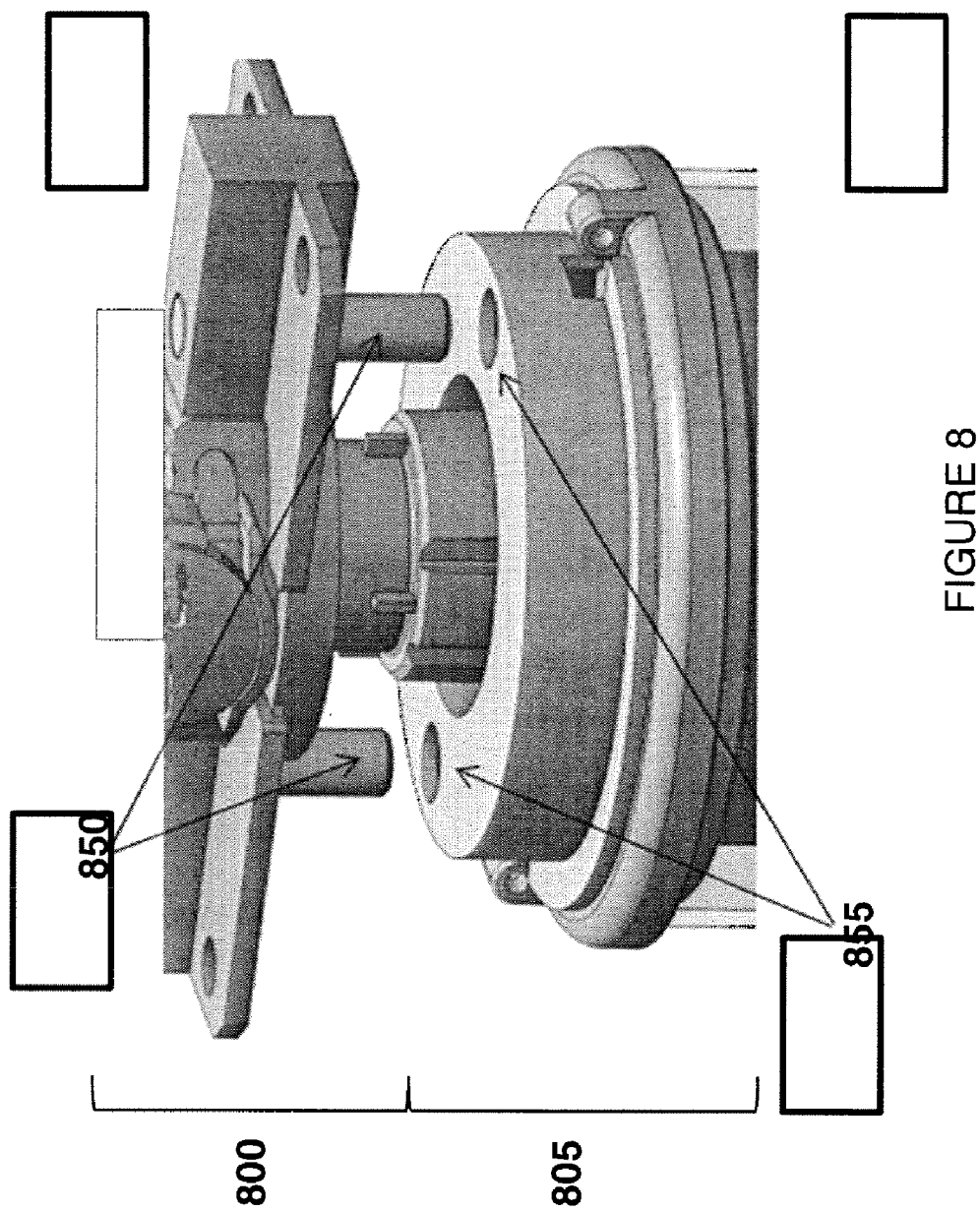
FIG. 8 depicts a male connector and a female connector.

Referring to FIG. 8, a female connector 800 can include at least one pin 850. A pin 850 can be configured to be inserted into a hole 855 in a ring housing 860. Inserting a pin 850 into a hole 855 in a ring housing 860 can release a catching mechanism (not shown).

Figure 9:
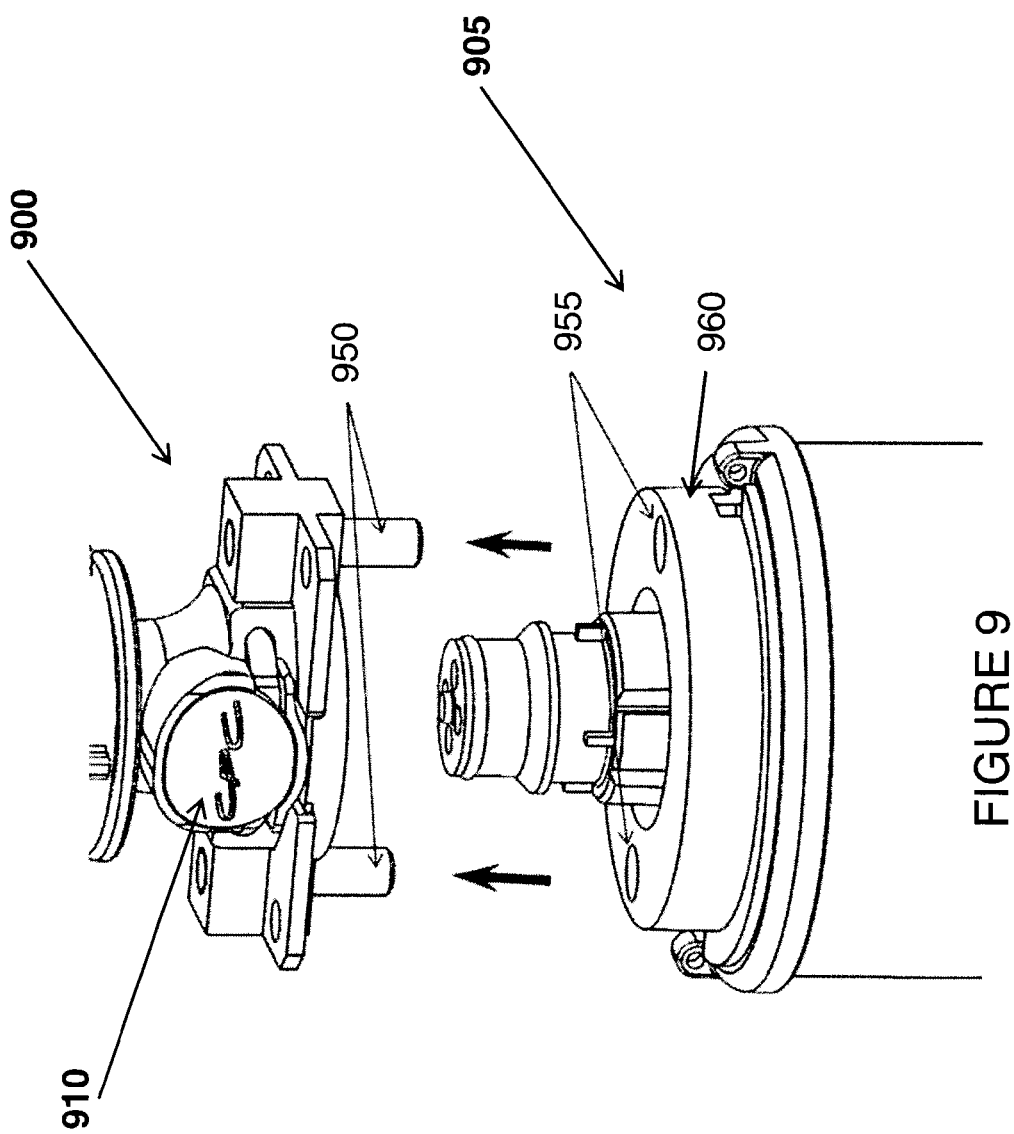
FIG. 9 depicts a perspective view of a male connector and a female connector.
Figure 10:
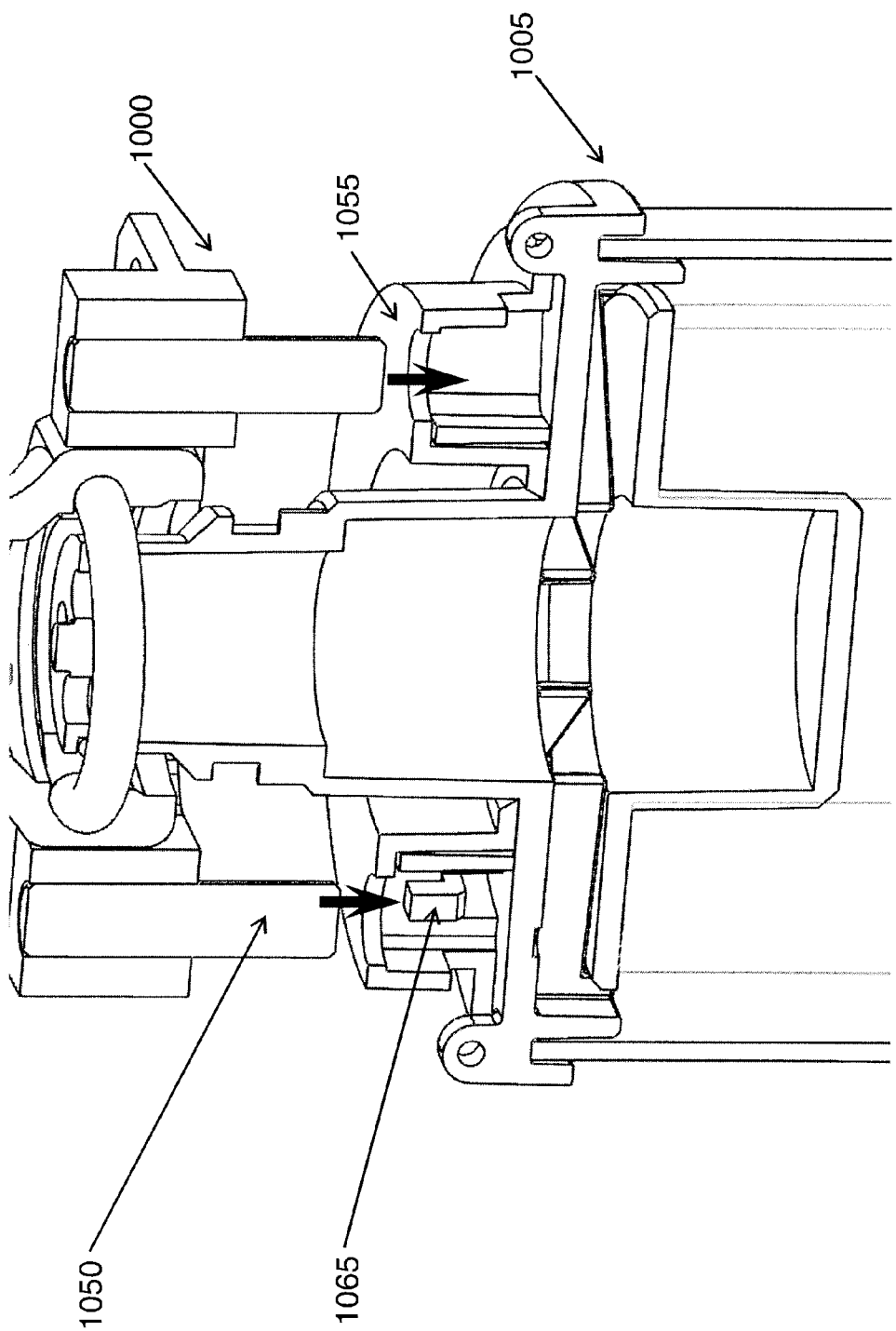
FIG. 10 is a perspective view of the male and female connectors and pin operation.

For example, referring to FIG. 9, as the male cartridge 905 is plugged in the female cartridge 900, two or more pins 950 can be inserted into holes 955 in the ring housing 960. As a pin travels into a hole, a pin can trip a tab (not shown) which can enable a "rotational feature." As shown in FIG. 10, as a pin 1050 of a female connector 1000 travels into a hole 1055 of a male connector 1005, the pin 1050 can release a catching mechanism 1065, which is explained further below.

Figure 11:
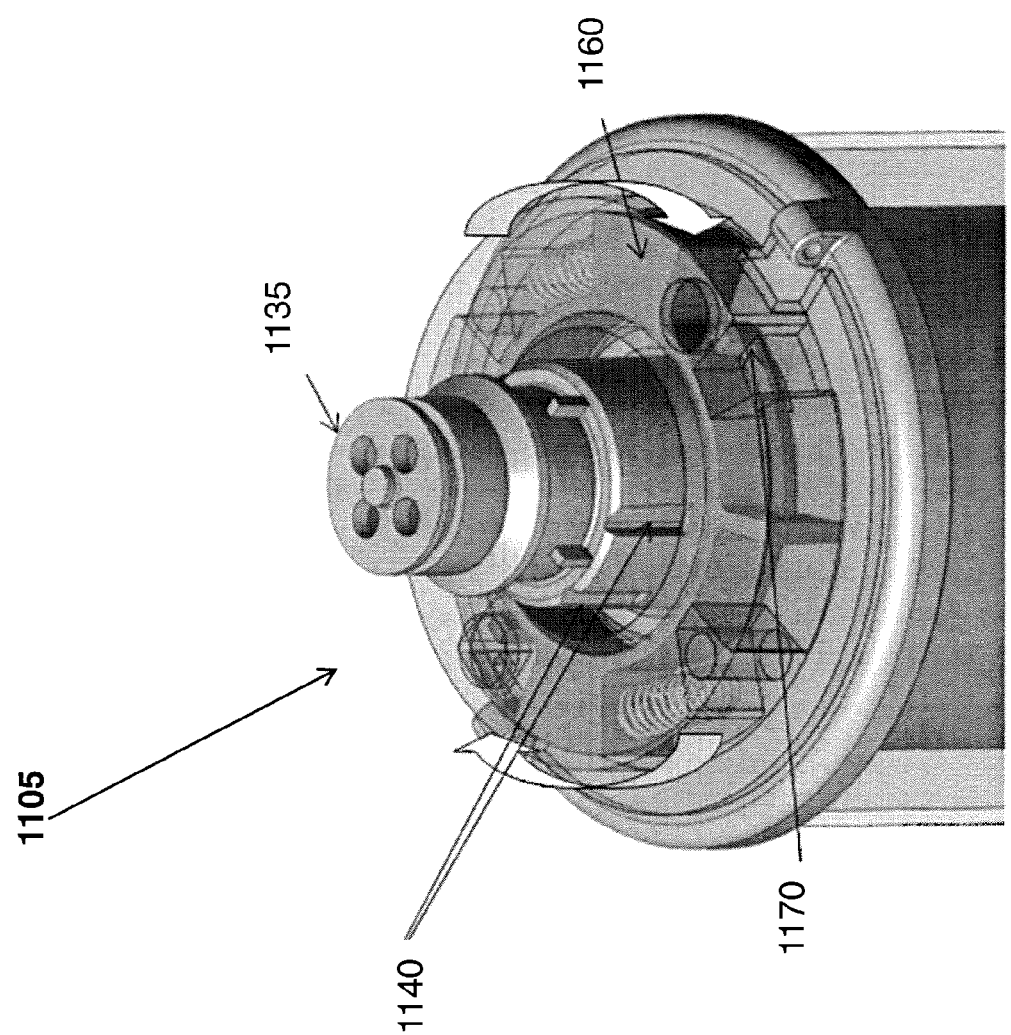
FIG. 11 depicts a perspective view of a ring housing and a rotational ring attached to the male connector.

In some embodiments, a male connector 1105 can include a rotational ring 1170 and a ring housing 1160 (FIG. 11). A rotational ring 1170 and a ring housing 1160 can encircle a protrusion 1135 of a male connector 1105. A rotational ring 1170 can be configured to rotate (as indicated by arrows) within a ring housing 1160. FIG. 9 shows an additional view of a ring housing 960 of a male connector 905 in relation to a female connector 900.

Figure 12:
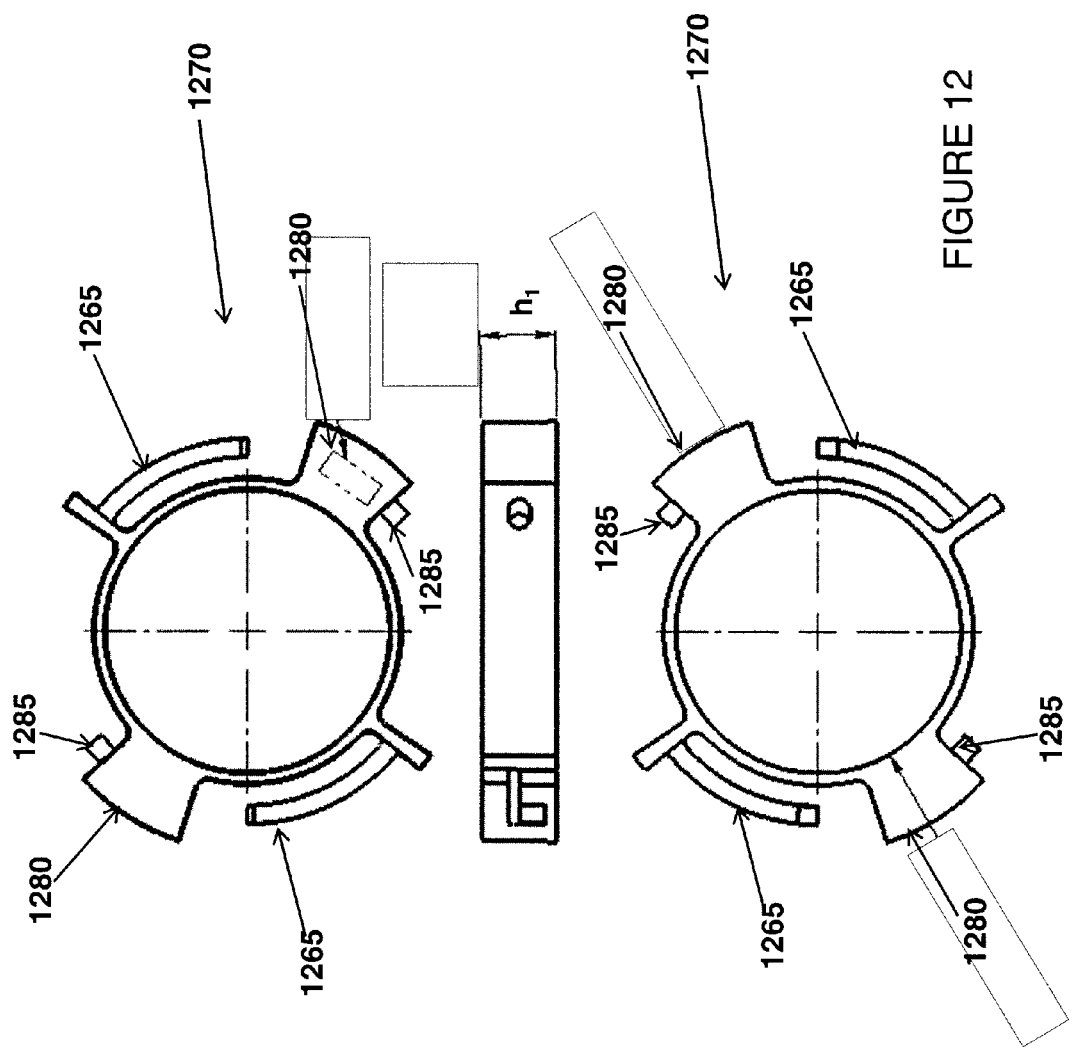
FIG. 12 depicts views of a rotational ring.

Referring to FIG. 12, a rotational ring 1270 can vary in width around the ring. For example, some regions of the ring can be thin 1275. In some regions, the ring can be wider 1280. The maximum width of the rotational ring 1270 must be less than the channel of the ring housing (not shown) in order to allow the rotational ring 1270 to rotate within the ring housing. A portion of the ring 1270 that is wider can be an extension 1280. A rotational ring 1270 can include at least one extension 1280. An extension 1280 can be attached to a spring 1285, such that the spring 1285 can apply a force to the extension 1280 to bias the rotational ring 1270 to rotate. An extension 1280 can contact a flat surface of a ring housing to stop the rotational ring from rotating.

Referring again to FIG. 12, a rotational ring 1270 can include a catching mechanism, for example, a tab 1265. In some embodiments, a catching mechanism can be independent of the rotational ring, for example, a catching mechanism can be part of the ring housing.

Also referring to FIG. 12, a rotational ring 1270 can have a height $h_1$.

Figure 13:
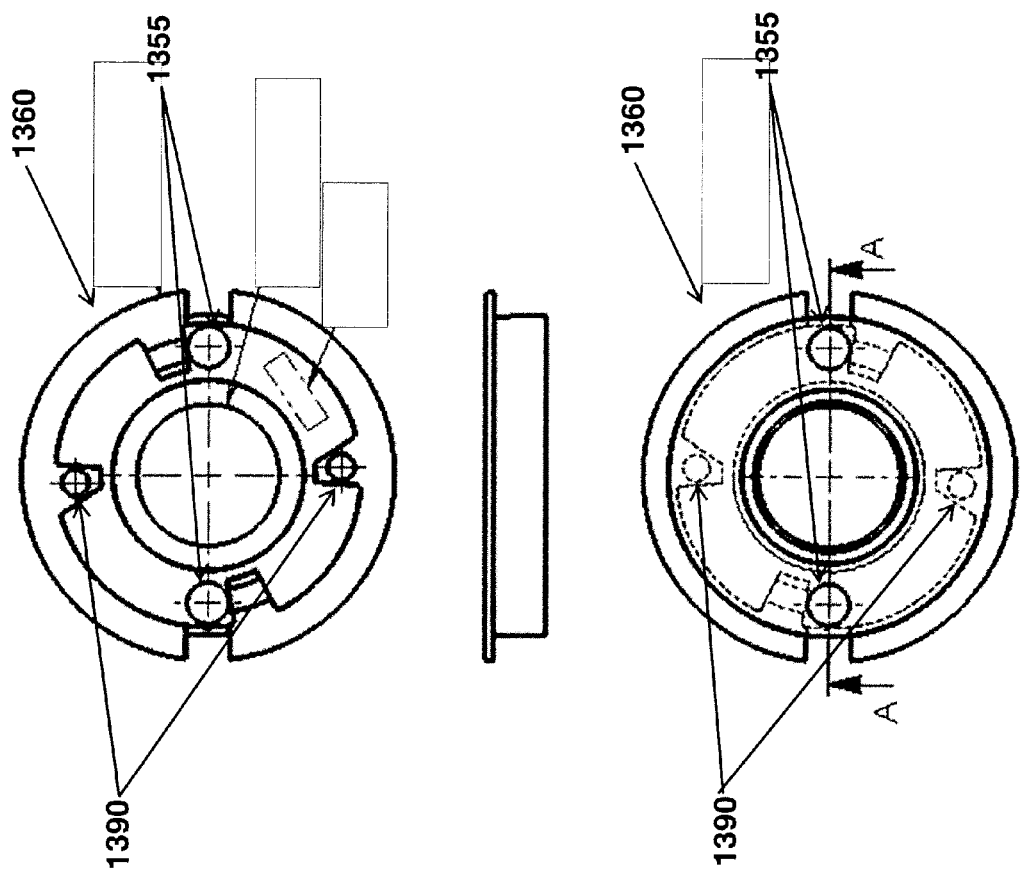
FIG. 13 depicts views of a ring housing.
Figure 14:
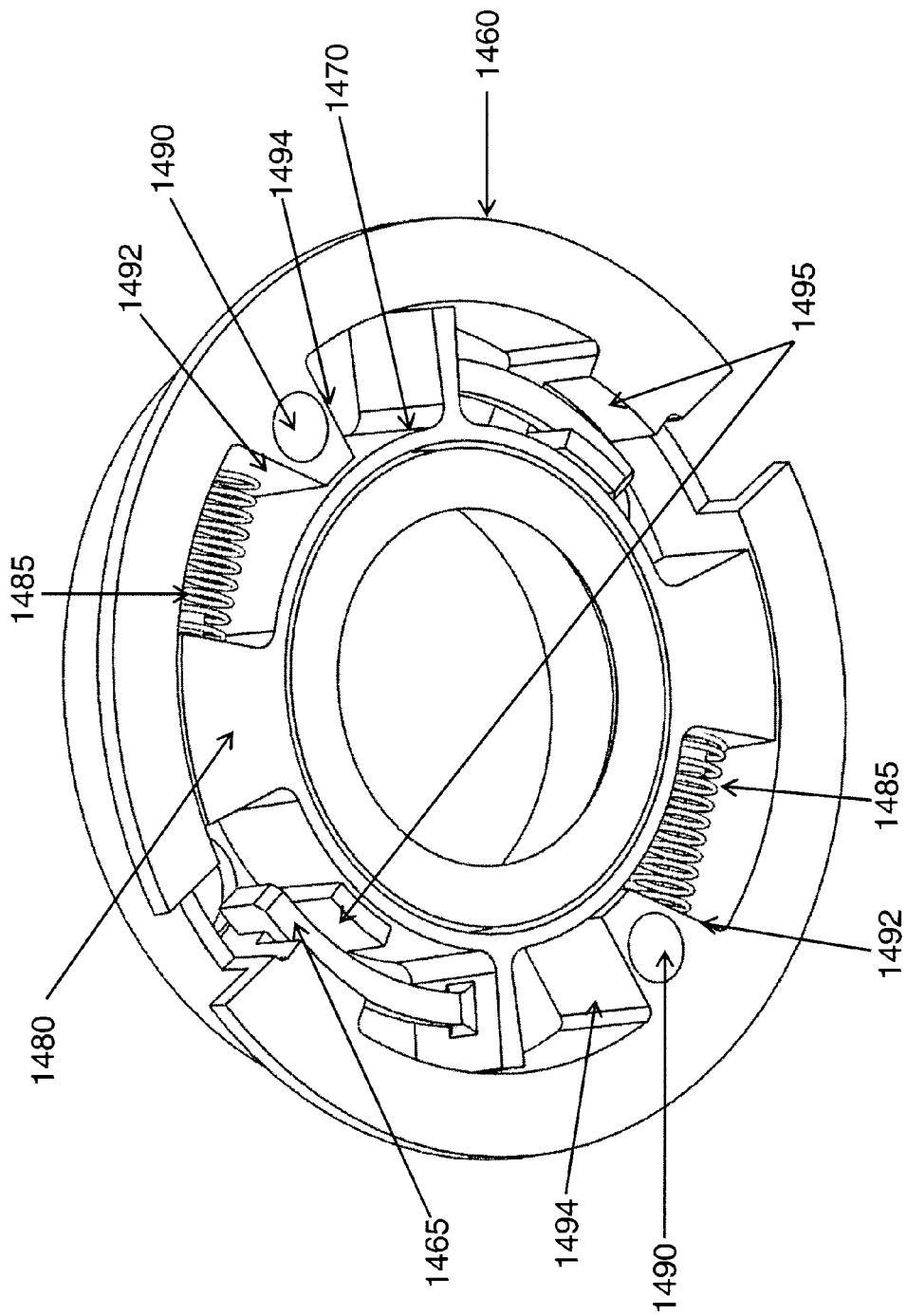
FIG. 14 is a perspective view a ring housing and rotational ring.

Referring to FIG. 13, a ring housing 1360 can include at least one hole 1355. The ring housing 1360 can also include a projection 1390. As shown in FIG. 14, a projection 1490 can provide a plane 1492 against which a compression spring 1485 can push against in order to bias the rotational ring 1470 to rotate. A projection 1490 can also include a flat surface 1494 which can stop the rotational ring 1470 in a first position by preventing the rotational ring 1470 from rotating through a channel 1495 in a ring housing 1460 further once the tension in a compression spring 1485 biasing the rotational ring 1470 has been released. A projection 1490 can prevent the rotational ring 1470 from rotating further by contacting an extension 1480 of a rotational ring 1470 with the flat surface 1494. A catching mechanism, for example a tab 1465, can hold the rotational ring 1470 in a second position, preventing the rotational ring 1470 from rotating.

Also referring to FIG. 13, a ring housing 1360 can have a height $h_2$.

Figure 15:
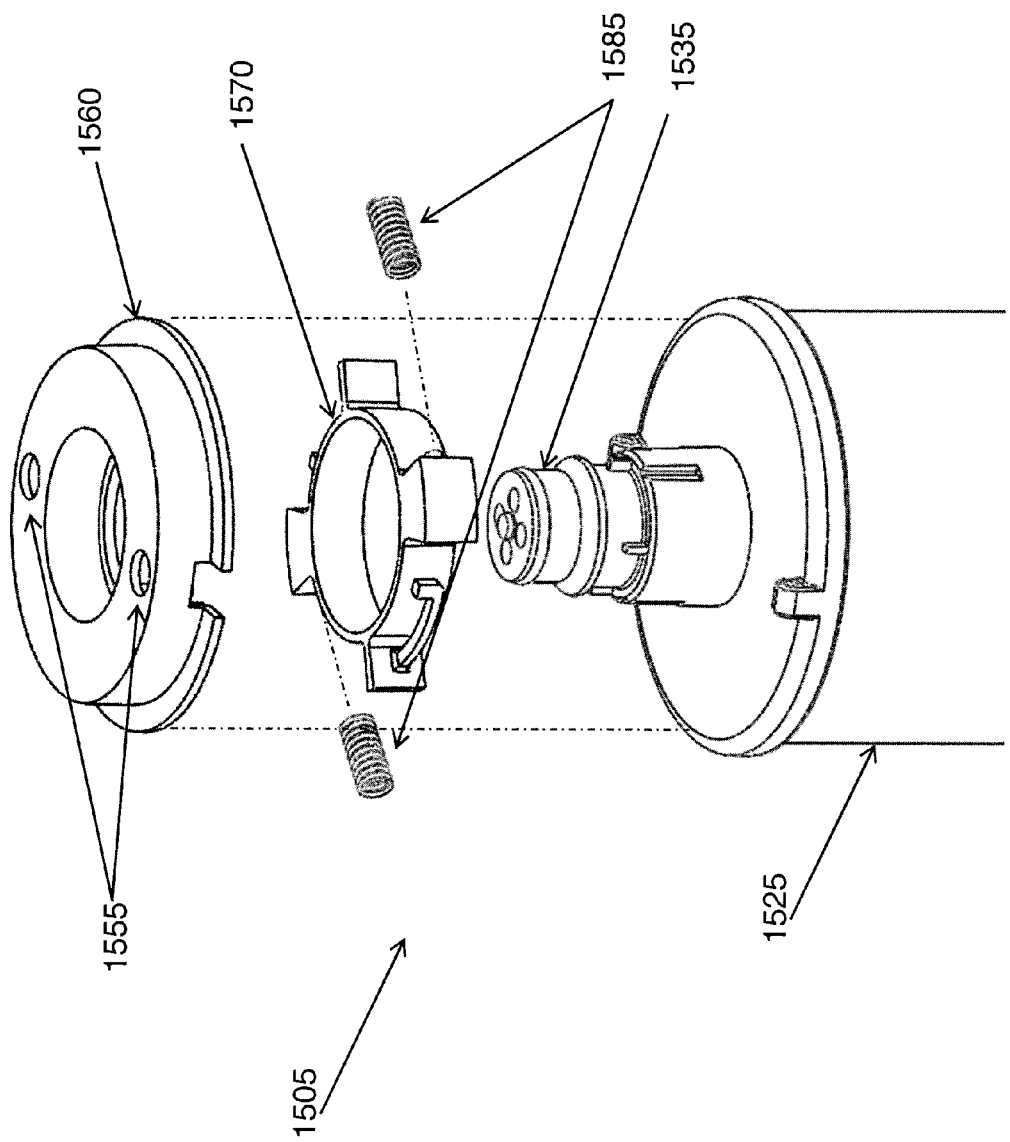
FIG. 15 depicts an exploded view of a male connector.

FIG. 15 illustrates one possible configuration of a male connector 1505 including a ring housing 1560 with at least one hole 1555, a rotational ring 1570, at least one spring 1585, and a protrusion 1535. The combination of male and female connectors can provide a one-time-use feature of the cartridge in the NO delivery system. For example, the male connector 1505 can include two or more molded parts and two or more springs 1585. As depicted in FIG. 15, the molded parts can include a rotational ring 1570 and a ring housing 1560. The molded parts can be made of polycarbonate and can be placed on top of the male cap 1525. The parts can encircle the protrusion 1535 of the male connector. The parts can be made of metal or any appropriate material, such as polycarbonate, to reduce cost. Once the male cap is glued to the cartridge, the parts can be organized as shown in FIG. 15. However, it should be understood that the male cap can be attached to the cartridge by other appropriate means known to a person of skill in the art.

In some embodiments, components of the mechanism, for example, the springs 1485 and the rotational ring 1470 can be placed under the ring housing 1460 (See FIG. 14). The rotational ring 1470 can be opaque to prevent seeing the mechanism. There can be a catching mechanism, for example, at least one tab 1465, which can be placed under the a channel 1495. This assembly can then be placed onto the male cap (not shown), for example, by gluing it with adhesive. The assembly can be attached onto the male cap via any other appropriate means known to a person of skill in the art. Once the rotational parts have been attached, the cartridge can be ready for use.

In some embodiments, a male connector can be plugged into the female connector, for example, by aligning the pins 950 with the holes 955 in the housing 960 (FIG. 9; see also FIG. 10). The connectors 900, 905 can be pushed in until the connectors 900, 905 are together. The connectors can be held in place, for example, by a thumb latch 910.

A rotational ring can be biased to rotate to a first position. For example, in FIG. 11, the rotational ring 1170 can be biased to rotate by at least one spring 1185 (see also element 1485, FIG. 14). In a preferred embodiment, a spring can be a compression spring. However, additional mechanisms for biasing the rotational can also be used, for example, a torsion spring. A rotational ring can be held in a second position by a catching mechanism.

Figure 16:
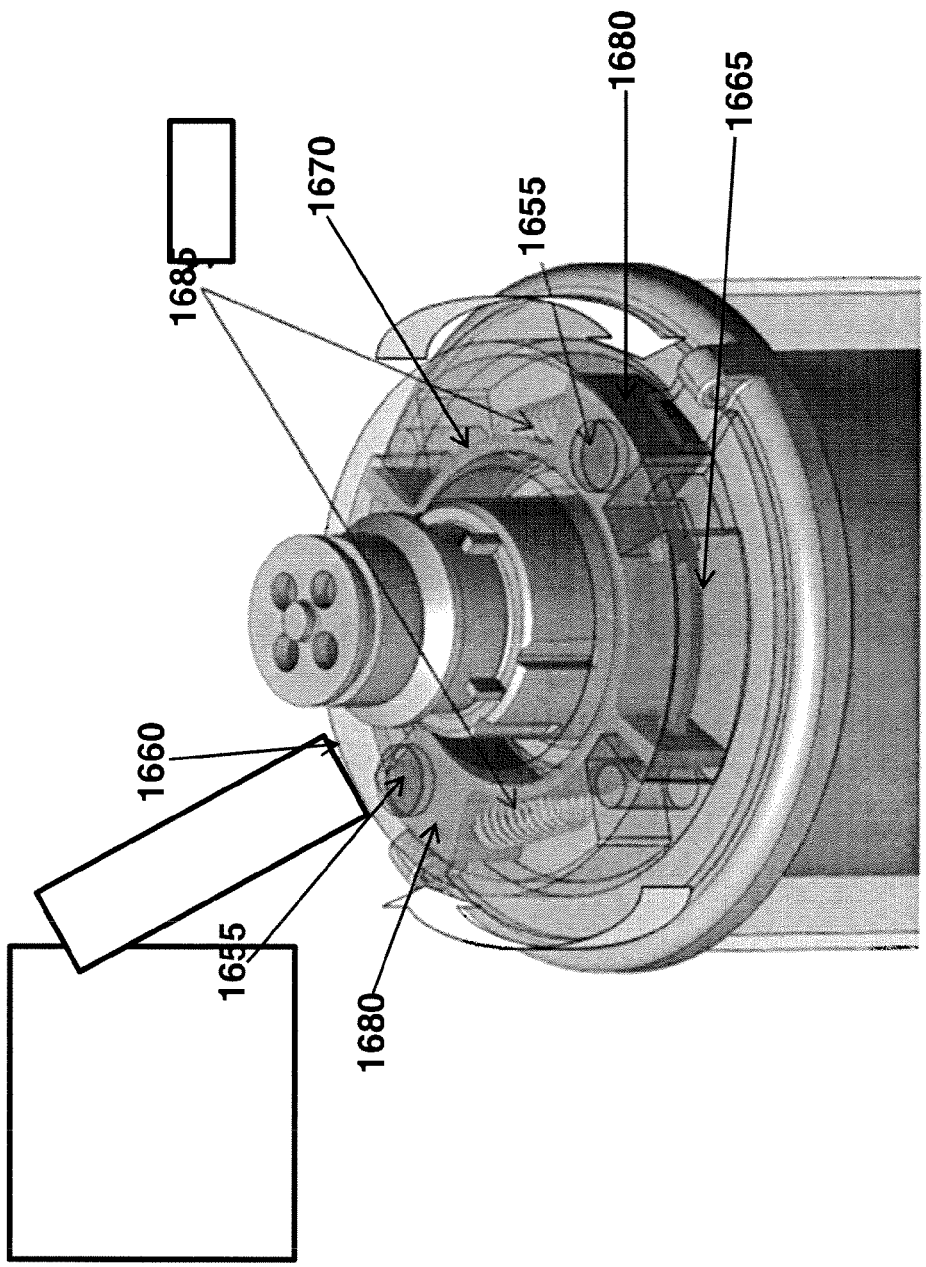
FIG. 16 illustrates a male connector.

Referring to FIG. 16, a ring housing 1660 can include at least one hole 1655. The at least one hole 1655 in a ring housing 1660 may not align with an at least one extension 1680 of a rotational ring 1670 when the rotational ring 1670 is in a second position (i.e. when the rotational ring 1670 can be held by the catching mechanism 1665) (position not shown). The at least one hole 1655 in a ring housing 1660 can align with an at least one extension 1680 of a rotational ring 1670 when the rotational ring 1670 is in a first position (i.e. once the rotational ring has been released from the catching mechanism) (as shown in FIG. 16). As shown in FIG. 16, when an extension 1680 of the rotational ring 1670 aligns with a hole 1655 in the ring housing 1660, the extension 1680 can block the hole 1655 such that an object, for instance a pin (not shown), cannot enter the hole 1655.

Referring to FIG. 14, when the pins (not shown) enter into the holes 1455, a catching mechanism 1465 can release (e.g. the tabs can be depressed) and a spring 1485 can bias the rotational ring 1470 to rotate. When the tabs 1465 are pushed by the pins, the tabs 1465 can be bent under the tab channel 1495 and the rotational ring 1470 can rotate. Now that the ring is free to rotate, the spring force (e.g. springs 1485) can push the ring 1470 and can cause it to rotate. The ring 1470 can rotate and can stop at the pins because the pins can physically block the way for the rotational ring rotate any further. However, once the female cartridge (not shown), including pins, is removed, the rotational ring 1470 can be free to rotate to its final position because the pins can be removed and may no longer prevent the rotational ring from rotating. A surface, for example, a flat surface 1494 can stop the ring 1470 from rotating and hold it in a final position. The rotational ring 1470 in the final position (see, for example, FIG. 16) can block the hole preventing reuse of the male connector and cartridge. The entire mechanism can be covered by an opaque piece (see, for example, element 960, FIG. 9).

Figure 17:
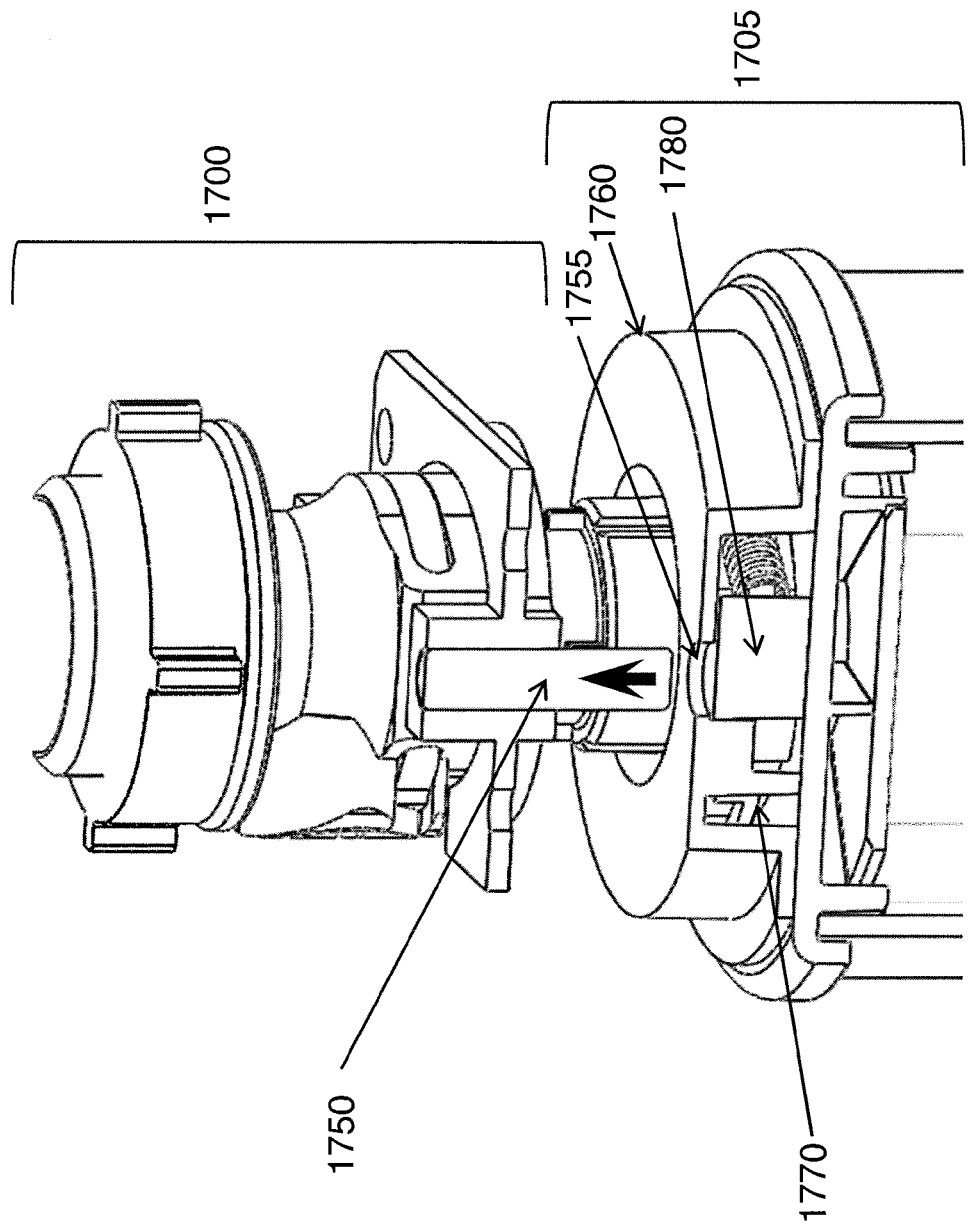
FIG. 17 depicts a male connector and a female connector.

Referring to FIG. 17, as a pin 1750 of a female connector 1700 is removed from a hole 1755 in a rotational ring 1760 of a male connector 1705, the rotational ring 1770 can rotate within the ring housing 1760 because the catching mechanism (not shown) has previously been released. Therefore, an extension 1780 of the rotational ring 1770 can align with a hole 1755 in a ring housing 1760 when the rotational ring 1770 gets to a first position. As shown in FIG. 17, when an extension 1780 of the rotational ring 1770 aligns with a hole 1755 in the ring housing 1760, the extension 1780 can block the hole 1755 such that an object, for instance a pin 1750, cannot enter the hole 1755.

Figure 22:
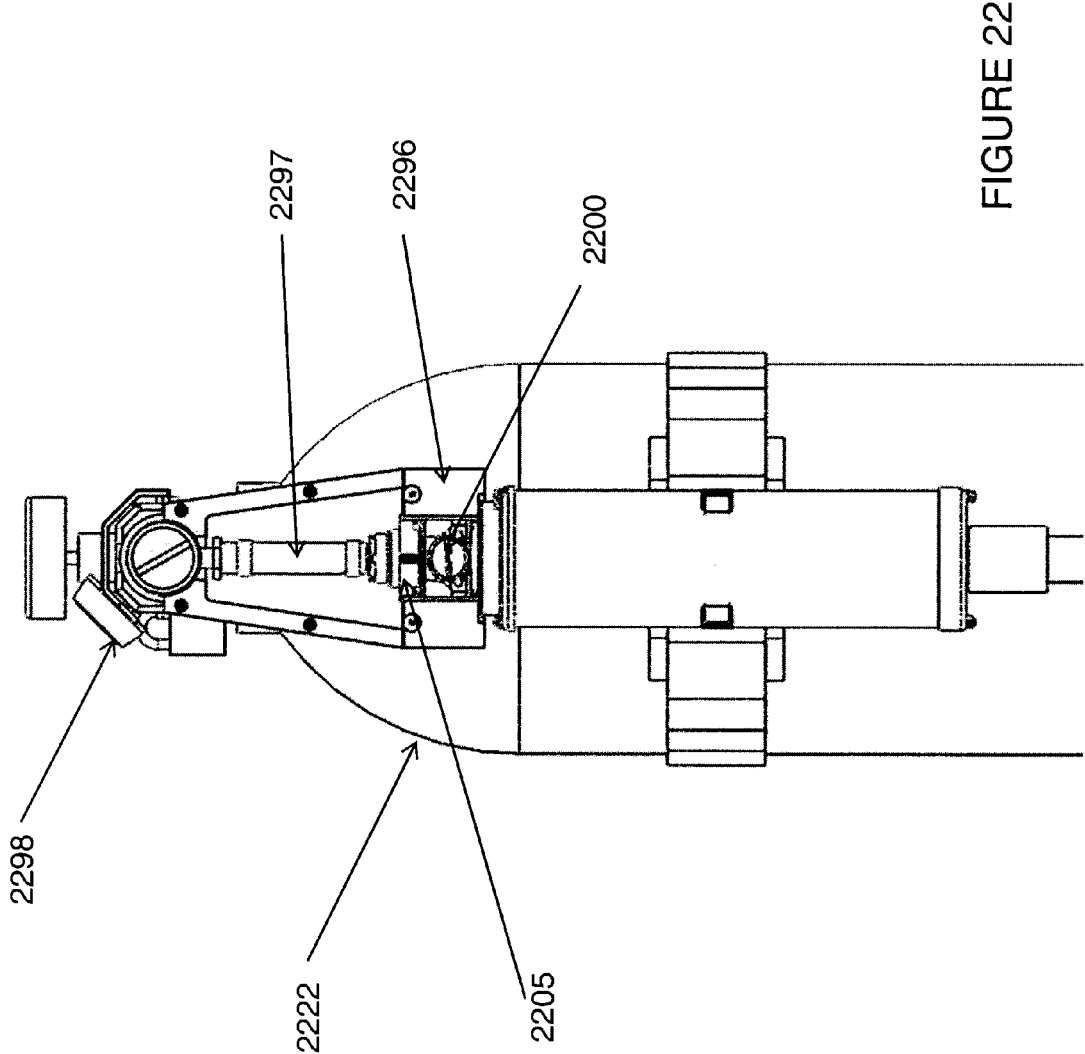
FIG. 22 is a perspective view of the NO delivery system with the male and female connectors shown in housing.

The combination of the male and female connectors can allow for a one-time-use feature of the cartridge in an NO delivery system (FIGS. 18-22). The combination of the male and female connectors only can allow for the use of a specific cartridge. FIG. 22 depicts the male 2205 and female 2200 connector in a housing 2296. The male and female connectors can be attached to a regulator pressure gauge 2298 via a hose (not shown). The regulator pressure gauge 2298 can be attached to a $NO_2$ tank 2222 to control the flow of $NO_2$ gas into the cartridge 2297.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A combination of connectors for a nitric oxide delivery system comprising
   a female connector coupled to a nitrogen dioxide source and
   a male connector coupled to a cartridge, wherein the male connector includes a rotational ring and a ring housing and the cartridge includes an inlet, an outlet, and a surface-active material coated with a reducing agent, wherein the inlet is configured to receive a gas flow comprising nitrogen dioxide and fluidly communicate the gas flow to the outlet through the surface-active material such that the reducing agent reacts with nitrogen dioxide in the gas flow and converts the nitrogen dioxide to nitric oxide.

2. The combination of connectors of claim 1, wherein the male connector is coupled to the cartridge by molding the male connector into a portion of the cartridge.

3. The combination of connectors of claim 2, wherein the male connector is molded into a cap of the cartridge.

4. The combination of connectors of claim 1, wherein the female connector includes an opening and the male connector includes a protrusion, such that the protrusion of the male connector is configured to be inserted securely into the opening of the female connector.

5. The combination of connectors of claim 4, wherein the opening in the female connector includes an at least one tenon and the protrusion of the male connector includes an at least one mortise, wherein the at least one tenon is configured to be inserted into the at least one mortise.

6. The combination of connectors of claim 1, wherein the rotational ring and the ring housing encircle the protrusion of the male connector.

7. The combination of claim 1, wherein the rotational ring is configured to rotate within the ring housing.

8. The combination of claim 7, wherein the rotational ring is biased to rotate to a first position.

9. The combination of claim 8, wherein the rotational ring is held in a second position by a catching mechanism.

10. The combination of claim 9, wherein the ring housing includes an at least one hole and the rotational ring includes an at least one extension, and wherein the at least one extension in the rotational ring does not align with the at least one hole in the ring housing when the rotational ring is in the second position.

11. The combination of claim 10, wherein the at least one extension in the rotational ring aligns with the at least one hole in the ring housing when the rotational ring is in the first position.

12. The combination of claim 9, wherein the female connector includes an at least one pin, wherein the at least one pin is configured to be inserted into the at least one hole in the ring housing, and the at least one pin is configured to release the catching mechanism.

13. The combination of connectors of claim 1, wherein the female connector comprises a check valve which prevents the gas flow from flowing from the nitrogen dioxide source out the female connector when the female connector is not connected to the male connector.

14. A cartridge, comprising:
   a male connector coupled to the cartridge, wherein the male connector includes a rotational ring and a ring housing and is configured to attach to a female connector, and wherein the cartridge includes an inlet, an outlet, and a surface-active material coated with a reducing agent, wherein the inlet is configured to receive a gas flow comprising nitrogen dioxide and fluidly communicate the gas flow to the outlet through the surface-active material such that reducing agent reacts with nitrogen dioxide in the gas flow and converts the nitrogen dioxide to nitric oxide.

15. The cartridge of claim 14, wherein the male connector is coupled to the cartridge by molding the male connector into a portion of the cartridge.

16. The cartridge of claim 14, wherein the male connector is molded into a cap of the cartridge.

17. The cartridge of claim 14, wherein the male connector includes a protrusion and the protrusion includes an at least one tenon.

18. The cartridge of claim 14, wherein the rotational ring and the ring housing encircle the protrusion of the male connector.

19. The cartridge of claim 14, wherein the rotational ring is configured to rotate within the ring housing.

20. The cartridge of claim 19, wherein the rotational ring is biased to rotate to a first position.

21. The cartridge of claim 20, wherein the rotational ring is held in a second position by a catching mechanism.

22. The cartridge of claim 21, wherein the ring housing includes an at least one hole and the rotational ring includes an at least one extension, and wherein the at least one extension in the rotational ring does not align with the at least one hole in the ring housing when the rotational ring is in the second position.

23. The cartridge of claim 22, wherein the at least one extension in the rotational ring aligns with the at least one hole in the ring housing when the rotational ring is in the first position.

24. A method of converting nitrogen dioxide to nitric oxide, comprising:
   connecting a female connector to a male connector including a rotational ring and a ring housing, wherein the female connector is connected to a nitrogen dioxide source and the male connector is connected to a cartridge, and wherein the cartridge includes an inlet, an outlet, and a surface-active material coated with a reducing agent, wherein the inlet is configured to receive a gas flow comprising nitrogen dioxide and fluidly communicate the gas flow to the outlet through the surface-active material, such that the reducing agent reacts with nitrogen dioxide in the gas flow and converts the nitrogen dioxide to nitric oxide; and
   passing the gas flow including nitrogen dioxide through the female connector and the male connector into the inlet of the cartridge.

25. The method of claim 24, wherein connecting the female connector to the male connector includes inserting a protrusion of the male connector securely into an opening of the female connector.

26. The method of claim 25, wherein the opening of the female connector includes an at least one tenon and the protrusion of the male connector includes an at least one mortise, and wherein inserting a protrusion of the male connector securely into an opening of the female connector includes inserting the at least one tenon into the at least one mortise.

27. The method of claim 24, the method further comprising inserting an at least one pin of the female connector into an at least one hole in the ring housing of the male connector that is not aligned with an at least one extension in the rotational ring of the male connector, wherein the rotational ring is biased to rotate to a first position and the rotational ring is held in a second position by a catching mechanism.

28. The method of claim 27, wherein inserting the at least one pin of the female connector into the at least one hole in the ring housing of the male connector releases the catching mechanism.

29. The method of claim 28, the method further comprising removing the at least one pin of the female connector from the at least one hole in the ring housing, and permitting the rotational ring to rotate to the first position, wherein the at least one extension in the rotational ring aligns with the at least one hole in the ring housing when the rotational ring is in the first position.

30. A method of manufacturing a cartridge, comprising coupling a male connector including a rotational ring and a ring housing to the cartridge, wherein the male connector is configured to attach to a female connector, and wherein the cartridge includes an inlet, an outlet, and a surface-active material coated a reducing agent, wherein the inlet is configured to receive a gas flow comprising nitrogen dioxide and fluidly communicate the gas flow to the outlet through the surface-active material, such that the reducing agent reacts with nitrogen dioxide in the gas flow and converts the nitrogen dioxide to nitric oxide.

31. The method of claim 30, wherein coupling the male connector to the cartridge includes molding the male connector into a portion of the cartridge.

32. The method of claim 31, wherein the male connector is molded into a cap of the cartridge.

33. The method of claim 30, wherein the male connector includes a protrusion and the protrusion includes an at least one tenon.

* * * * *